United States Patent
Dougdag et al.

(10) Patent No.: US 7,209,604 B2
(45) Date of Patent: Apr. 24, 2007

(54) ANTI-PMD SYSTEM

(75) Inventors: Kamel Dougdag, Andresy (FR); Eric Lainet, Laffitte (FR)

(73) Assignee: Alcatel, Paris (FR)

( * ) Notice: Subject to any disclaimer, the term of this patent is extended or adjusted under 35 U.S.C. 154(b) by 330 days.

(21) Appl. No.: 10/867,782

(22) Filed: Jun. 16, 2004

(65) Prior Publication Data

US 2005/0018943 A1    Jan. 27, 2005

(30) Foreign Application Priority Data

Jun. 24, 2003   (FR) .................................. 03 07591

(51) Int. Cl.
*G02B 6/00*  (2006.01)
(52) U.S. Cl. .......................................... 385/11; 65/402
(58) Field of Classification Search ................ 385/11, 385/147; 65/402
See application file for complete search history.

(56) References Cited

U.S. PATENT DOCUMENTS

| | | | |
|---|---|---|---|
| 3,762,142 A | | 10/1973 | Rasmussen |
| 5,298,047 A | * | 3/1994 | Hart et al. ...................... 65/432 |
| 5,418,881 A | * | 5/1995 | Hart et al. ...................... 385/11 |
| 5,897,680 A | * | 4/1999 | Geertman .................... 65/402 |
| 6,550,281 B1 | * | 4/2003 | Hawk ........................... 65/402 |
| 6,550,828 B2 | * | 4/2003 | Warden ....................... 292/288 |
| 6,789,399 B1 | * | 9/2004 | Fujimaki et al. ............... 65/402 |
| 6,837,074 B2 | * | 1/2005 | Cocchini et al. .............. 65/402 |
| 6,993,229 B2 | * | 1/2006 | Chen et al. ................... 65/402 |
| 2004/0003628 A1 | * | 1/2004 | Shimazu et al. ............... 65/402 |
| 2006/0133751 A1 | * | 6/2006 | Chen et al. .................. 385/123 |

FOREIGN PATENT DOCUMENTS

| | | |
|---|---|---|
| EP | 0 582 405 A1 | 2/1994 |
| EP | 1 013 618 A1 | 6/2000 |
| GB | 2 127 870 A | 4/1984 |
| JP | 11-302042 | 11/1999 |
| JP | 2000-247675 | 9/2000 |
| WO | WO 97/26221 | 7/1997 |

* cited by examiner

*Primary Examiner*—Frank G. Font
*Assistant Examiner*—James P. Hughes
(74) *Attorney, Agent, or Firm*—Sughrue Mion, PLLC

(57) ABSTRACT

The invention provides an anti-PMD system comprising: an anti-PMD pulley (1) over which an optical fiber (4) is to roll and which is mounted to rotate about an axis of rotation (ar); and at least two optical fiber guide devices (2, 3) situated on either side of the anti-PMD pulley (1); the axis of rotation (ar) of the anti-PMD pulley (1) being stationary; the only degree of freedom of the anti-PMD pulley (1) being rotation about the axis of rotation (ar) of the anti-PMD pulley (1); and at least one of the guide devices (2, 3) being movable in translation in a translation direction (dt) that is not orthogonal to the axis of rotation (ar) of the anti-PMD pulley (1).

18 Claims, 1 Drawing Sheet

ANTI-PMD SYSTEM

Figure 1:
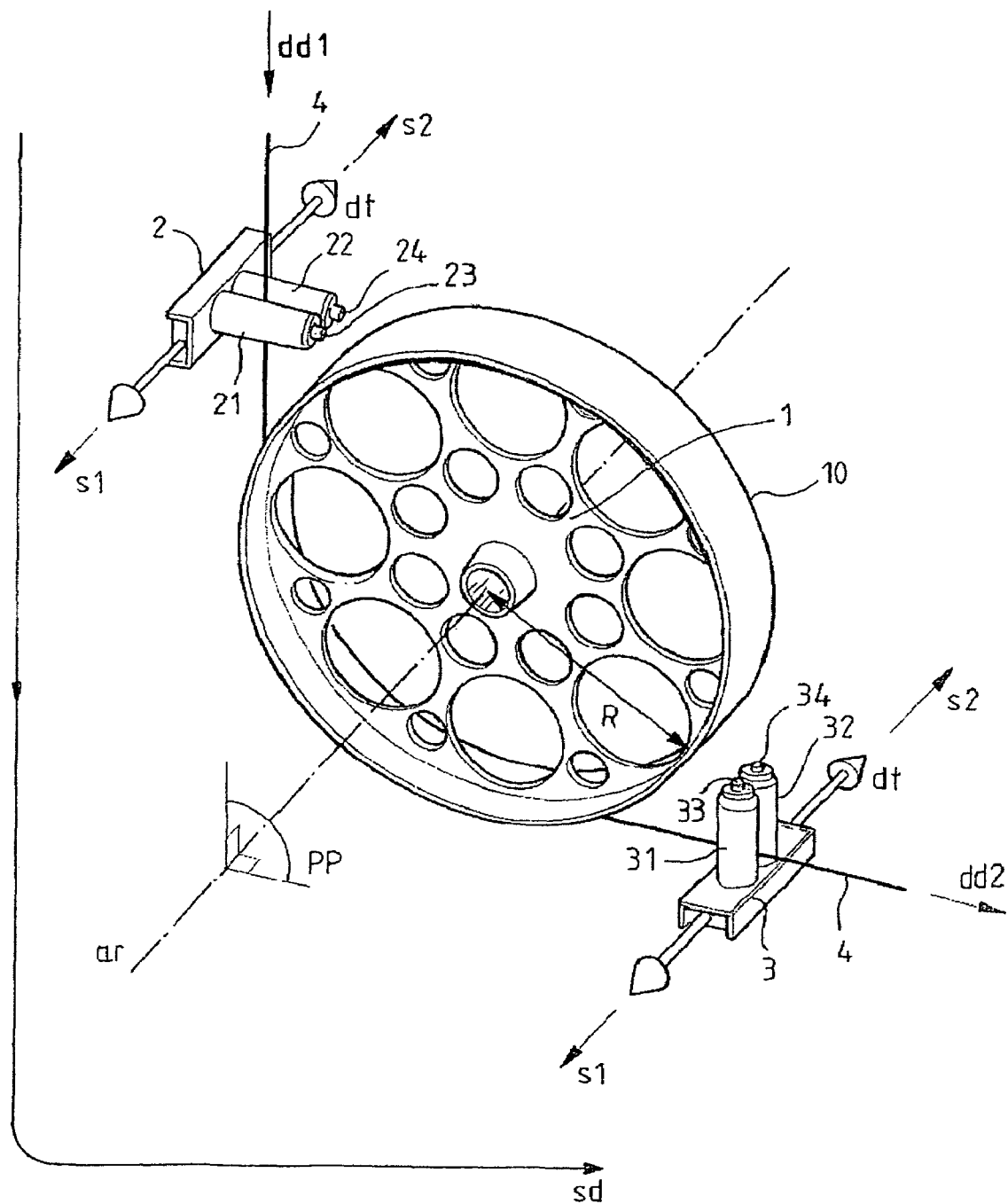

The invention relates to the field of anti-PMD systems which are intended to reduce the PMD of an optical fiber during the fiber-drawing process. PMD stands for polarization mode dispersion. Polarization mode dispersion is a drawback for an optical fiber since it leads to degradation of the signal propagating in the optical fiber. This drawback becomes of ever increasing magnitude with the use of increasing data rates in optical fiber communications networks.

In first prior art, it is known to use an anti-PMD system referred to as the "SZ system". This system is based on using an oscillating rotary pulley. The oscillating pulley is an anti-PMD pulley. Such a system is described, for example, in European patent EP 0 582 405 incorporated herein by reference, or in European patent EP 0 744 636. The SZ system is located at the base of the fiber-drawing tower, in the plane defined by the optical fiber passing round a bend at the anti-PMD pulley. The plane in which the optical fiber passes is also referred to as the "fiber-drawing plane". The pulley rotates about its own axis of rotation and also oscillates about the vertical fiber-drawing axis which is its oscillation axis, and it oscillates symmetrically about the fiber-drawing plane. V-groove pulleys situated ahead of the oscillating pulley, and guide fingers situated after the oscillating pulley enable the optical fiber to be guided in the fiber-drawing plane. The axes of the V-groove pulleys are stationary. The assembly constituted by the guide fingers is stationary overall, i.e. the assembly constituted by the guide fingers does not move in translation, does not move in rotation, and does not present movement constituting a combination of translation and rotation. The V-groove pulleys do not move in translation. The oscillations of the oscillating pulley, alternatively from right to left and then from left to right, apply twisting torque to the optical fiber which is already covered in its secondary covering. A drawback of that prior art is that it leads to optical fibers in which PMD nevertheless remains too high because of the rotation of the optical fiber on the surface of the oscillating pulley, which rotation is not sufficiently controlled. Either while the angle between the plane of the oscillating pulley and the fiber-drawing plane is increasing, or else while the frequency of oscillation of the oscillating pulley is increasing, the position of the optical fiber rolling on the surface of the oscillating pulley is not fully under control, since the inertia of the optical fiber tends to cause it to remain in the center of the pulley instead of being maintained in the fiber-drawing plane so as to increase the angle between the plane of the oscillating pulley and the plane of the fiber to the desired value. This tendency to remain in position can cause the optical fiber to slide over the surface of the oscillating pulley instead of rolling thereon, at the ends of the oscillating strokes of the oscillating pulley.

In second prior art, it is known, e.g. from patent abstracts of Japan JP 2000344539, to use a pulley that moves in translation as an anti-PMD pulley instead of using the oscillating pulley of the first prior art. The guidance means situated upstream and downstream from the anti-PMD pulley do not move in translation. That second prior art presents the same problem of insufficient control of rotation of the optical fiber on the surface of the anti-PMD pulley because of the inertia of the optical fiber. In addition, the anti-PMD pulley that is movable in translation about its axis of rotation also presents the drawback of applying twist to the optical fiber that decreases with fiber-drawing speed for a given frequency of motion in translation of the anti-PMD pulley, or else it is necessary to cause the frequency of motion in translation to vary, which would complicate the system significantly.

In third prior art, it is known to use two anti-PMD pulleys to wedge the optical fiber between them and impose the angle between the planes of the pulleys and the fiber-drawing plane, e.g. two pulleys that move in translation relative to each other, as in U.S. patent application No. 2002/0026813, or else to use two oscillating pulleys. That third prior art provides adequate control over rotation of the optical fiber at moderate fiber-drawing speeds, but at the cost of additional drawbacks. Those additional drawbacks include a mechanical system that is complicated and fragile for wedging the optical fiber while attempting not to damage it excessively, and problems that arise at high fiber-drawing speeds, typically above 1000 meters per minute (m/min) concerning the quality of the covering if the optical fiber is wedged too tightly between the anti-PMD pulleys, or concerning guidance of the optical fiber if it is not wedged tightly enough between the anti-PMD pulleys. Said guidance problems lead to a decrease in the duration of contact between the optical fiber and the anti-PMD pulleys, and thus to a decrease in the effectiveness of the rotation of the optical fiber over the anti-PMD pulleys, whence a reduction in the twisting torque applied to the optical fiber by the anti-PMD pulleys, and consequently to a value of PMD that is too great in the final optical fiber, i.e. the fiber at the end of fiber-drawing. Problems associated with variation in the diameter of the optical fiber are very poorly handled by systems of that kind that compress the optical fiber between two anti-PMD pulleys, since whenever the diameter of the optical fiber varies, the compression force is always too great or too small.

The invention proposes an improved anti-PMD system making it possible simultaneously to achieve good control over rotation of the optical fiber on the anti-PMD pulley which is obtained by better guidance of the optical fiber in terms of its angular offset relative to the plane of the anti-PMD pulley, good quality covering on the optical fiber obtained by the absence of excessive compression of the optical fiber, and an anti-PMD system that is also relatively simple and robust. To do this, the anti-PMD pulley has an axis of rotation that is stationary and a single degree of freedom about said axis, which is a degree of freedom in rotation about said axis, while at least one of the guide devices is movable in translation in such a manner as to be capable of varying the angle between the fiber-drawing plane and the plane of the anti-PMD pulley, while controlling the actual rotation of the optical fiber on the surface of the anti-PMD pulley. Contrary to the first and second prior art, the rotation of the optical fiber on the surface of the anti-PMD pulley is thus controlled and mastered, since the elements responsible for varying the angle between the fiber-drawing plane and the plane of the anti-PMD pulley is a guide element which consequently provides better control over the angular offset between the plane of the anti-PMD pulley and the fiber-drawing plane of the optical fiber. Instead of guidance about two perpendicular axes as in the first prior art using an oscillating pulley, guidance is applied about a single axis by imparting motion in translation to the guide device, which is simpler to achieve. The use of a single anti-PMD pulley avoids all of the problems of the optical fiber being compressed, as occur in the third prior art, while reducing the number of degrees of freedom for the anti-PMD pulley leads to a system that is simpler and more robust. Furthermore, unlike the second prior art and some of the third prior art, in which use is made of an anti-PMD pulley that is also movable in translation, the twisting torque that is applied to the optical fiber is independent of the fiber-drawing speed (where twisting torque is expressed as a number of turns per meter of optical fiber). At a constant frequency of oscillation, the mean speed of rotation of the optical fiber is constant regardless of the fiber-drawing speed. However, the profile of rotation, i.e. the distribution in space and the direction of rotation along the fiber varies. For a system with a pulley that is movable in translation as in the second prior art, the mean speed of rotation decreases with fiber-drawing speed, and the profile of rotation also varies with fiber-drawing speed.

The invention provides an anti-PMD system comprising: an anti-PMD pulley over which an optical fiber is to roll and which is mounted to rotate about an axis of rotation; and at least two optical fiber guide devices situated on either side of the anti-PMD pulley; the system being characterized in that the axis of rotation of the anti-PMD pulley is stationary; in that the only degree of freedom of the anti-PMD pulley is rotation about the axis of rotation of the anti-PMD pulley; and in that at least one of the guide devices is movable in translation in a translation direction that is not orthogonal to the axis of rotation of the anti-PMD pulley.

In the invention, there is preferably provided an anti-PMD system in which, while the optical fiber is being drawn, the guide device that is movable in translation angularly offsets the optical fiber relative to a plane perpendicular to the axis of rotation of the anti-PMD pulley, and the anti-PMD pulley applies twisting torque to the optical fiber alternately in the clockwise direction and in the counterclockwise direction so as to reduce the PMD of the optical fiber.

The invention will be better understood and other features and advantages will appear from the following description and the accompanying drawing, given by way of example and in which:

FIG. 1 is a diagram of a preferred example of an anti-PMD system of the invention.

The various steps in fabricating an optical fiber during the fiber-drawing process have a major influence on ovalization of the refractive index and of the shape of the core of the preform, and consequently also of the optical fiber, where such ovalization constitutes one of the causes of significant PMD. Optical fibers in which PMD is too great cannot be sold since said PMD degrades the optical signal conveyed by said optical fiber to too great an extent. During fiber-drawing, the method used for reducing the PMD of an optical fiber consists in causing the optical fiber to twist about its own axis alternately in one direction of rotation, e.g. clockwise, and then in the other direction, e.g. counter-clockwise. The anti-PMD system which serves to twist the optical fiber is situated at the base of the fiber-drawing tower and preferably acts on the optical fiber when it is already covered in both coverings. The twisting torque applied to the optical fiber is transmitted all the way to the viscous cone of preform glass situated in the fiber-drawing tower several meters above the anti-PMD system. The "soft" and twisted glass which is pulled towards the bottom of the fiber-drawing tower by traction from a capstan and subsequently cools quickly (the glass is said to be "quenched"), thereby freezing in the glass the twisting imparted by the anti-PMD system. Within reasonable limits, the greater the extent to which the optical fiber is twisted alternately in one direction and then in the other, the smaller the PMD of said optical fiber and the better the fiber. The PMD associated with index ovalization (ovalization of the core index in the plane perpendicular to the light transmission axis) can be corrected by twisting the optical fiber, as can geometrical ovalization.

However, PMD associated with a fault in the glass, or with variation in index on the longitudinal axis of the optical fiber is not modified by the anti-PMD system.

FIG. 1 is a diagram of a preferred example of an anti-PMD system of the invention. Arrow sd shows the upstream-downstream direction followed by the optical fiber 4 during fiber-drawing. An anti-PMD pulley 1 is rotatable about an axis ar of rotation. The plane PP perpendicular to the axis ar is the plane of the anti-PMD pulley 1. The peripheral surface 10 of the anti-PMD pulley 1 is the surface on which the optical fiber 4 is to roll. The anti-PMD pulley 1 is of radius R. On either side of the anti-PMD pulley 1, there are situated guide devices 2 and 3.

Upstream from the anti-PMD pulley 1, there is the Upstream guide device 2. The upstream guide device 2 is movable in translation in a translation direction represented by arrows dt. The upstream guide device 2 comprises two guide fingers 21 and 22 between which the optical fiber 4 passes. In order to avoid damaging the quality of the covering on the optical fiber 4, the two guide fingers 21 and 22 are mounted to rotate about their respective axes 23 and 24. At the upstream guide device 2, the travel direction of the optical fiber 4 is represented by arrow dd1.

Downstream from the anti-PMD pulley 1 there is the downstream guide device 3. The downstream guide device 3 is movable in translation in a translation direction represented by arrows dt. The downstream guide device 3 comprises two guide fingers 31 and 32 between the optical fiber 4 passes. To avoid damaging the quality of the covering on the optical fiber 4, the two guide fingers 31 and 32 are mounted to rotate about their respective axes 33 and 34. At the downstream guide device 3, the travel direction of the optical fiber 4 is represented by arrow dd2.

The fiber-drawing plane is the plane defined by the directions dd1 and dd2.

The axis of rotation ar of the anti-PMD pulley 1 is stationary, i.e. it does not move relative to the anti-PMD system as a whole, which itself is stationary relative to the fiber-drawing tower having the anti-PMD system located at the bottom thereof. The axis ar is thus stationary, unlike prior art solutions involving an oscillating pulley where the axis of rotation is movable so as to enable the pulley to oscillate.

The only degree of freedom for the anti-PMD pulley 1 is rotation about the axis of rotation ar of the anti-PMD pulley 1. The anti-PMD pulley 1 does not have any other degree of freedom in a frame of reference associated with the anti-PMD system as a whole, and thus relative to the fiber-drawing tower, where any such degree of freedom would be selected from the conventional six degrees of freedom, namely three degrees of freedom in rotation and three degrees of freedom in translation. The anti-PMD pulley 1 possesses only one degree of freedom, and that degree is one degree of freedom in rotation about the axis ar. Specifically the anti-PMD pulley 1 does not possess any degree of freedom in translation.

At least one of the guide devices 2 and 3 is movable in translation in a translation direction dt which is not orthogonal to the axis of rotation ar of the anti-PMD pulley 1. Thus, by said guide device moving in translation, an angular offset can be imparted between the fiber plane and the plane PP of the anti-PMD pulley 1, which would not be possible if the direction dt were orthogonal to the axis of rotation ar.

The translation direction dt of the guide device 2 or 3 that is movable in translation is preferably situated in a plane parallel both to the axis of rotation ar of the anti-PMD pulley 1 and to the travel direction dd1 or dd2 of the optical fiber where it passes through said guide device 2 or 3 during fiber-drawing, and depending which guide device is movable in translation. This avoids any component of the movement in translation being in a direction that is orthogonal to the axis of rotation ar and to the optical fiber 4, where such movement is of no use in creating said angular offset.

The direction of translation dt is preferably parallel to the axis of rotation ar of the anti-PMD pulley 1. This avoids any component of the movement in translation being in a direction parallel to the optical fiber 4, which would be of no use in creating said angular offset.

The guide device 2 or 3 that is movable in translation moves in translation along the translation direction dt alternately in the direction s1 and then in the direction s2, with the ends of its stroke being advantageously situated on either side of the equilibrium position of the optical fiber 4, and preferably at equal distances from said equilibrium position of the optical fiber 4, which equilibrium position corresponds to the vertical in the fiber-drawing tower. In FIG. 1, the optical fiber 4 is shown in its equilibrium position.

While the optical fiber 4 is being drawn, the guide device that is movable in translation offsets the optical fiber 4 angularly relative to a plane perpendicular to the axis of rotation ar of the anti-PMD pulley 1, said perpendicular plane being the plane PP of the anti-PMD pulley 1. Because of this angular offset, and because of the travel speed of the optical fiber 4 at the anti-PMD pulley 1, said anti-PMD pulley 1 acts via contact between the optical fiber 4 and the surface 10 of the anti-PMD pulley 1 to apply twisting torque to the optical fiber 4 alternately in a clockwise direction and a counterclockwise direction, thereby reducing the PMD of the optical fiber 4.

With an oscillating pulley as in the first prior art, the twist profile imparted to the optical fiber 4 is a sinusoidal twist profile. A triangular twist profile is better than a sinusoidal twist profile, in particular for standard single mode optical fibers and for optical fibers with chromatic dispersion compensation. To impart a triangular twist profile to the optical fiber, it is necessary for substantially squarewave control to be applied. To achieve this preferred substantially squarewave control, the movement in translation of the guide device that is movable in translation is much slower at the ends of the stroke of said movement than in the middle of the stroke of said movement so as to impart a twist profile in the optical fiber while it is being drawn that is triangular rather than sinusoidal. Ideally, the movement in translation of the guide device that is movable in translation imparts a profile that is substantially triangular to the optical fiber. The middle of the stroke corresponds to the equilibrium position of the optical fiber 4.

In order to be able to achieve better control over the twist profile imparted to the optical fiber 4, the distance between at least one point of contact between the optical fiber 4 and the guide device that is movable in translation, and at least one point of contact between the optical fiber 4 and the anti-PMD pulley 1 is preferably less than or equal to the radius of the anti-PMD pulley 1. If the guide device that is movable in translation is located too far away from the contact area between the optical fiber 4 and the surface 10 of the anti-PMD pulley 1, then damping appears that smoothes the twisting profile imparted to the optical fiber 4 and can have the effect of transforming a twist profile that was originally triangular into a twist profile that is sinusoidal, which corresponds to degrading the twist profile imparted to the optical fiber 4. The guide device that is movable in translation is thus preferably located as close as possible to the contact area between the optical fiber 4 and the surface 10 of the anti-PMD pulley 1. Because of the presence of the anti-PMD pulley 1 itself, bringing the guide device that is movable in translation, e.g. the guide fingers, closer to the contact area between the optical fiber 4 and the surface 10 of the anti-PMD pulley 1 requires the size of the fingers to be reduced in order to avoid any contact between the anti-PMD pulley 1 and the guide device that is movable in translation. The distance between at least one point of contact between the optical fiber 4 and the guide device that is movable in translation, and at least one point of contact between the optical fiber 4 and the anti-PMD pulley 1, is preferably less than or equal to half the radius of the anti-PMD pulley 1. To ensure that such a point of contact exists, it suffices that the minor of all the distances between at least one point of contact between the optical fiber 4 and the guide device that is movable in translation, and at least one point of contact between the optical fiber 4 and the anti-PMD pulley 1 is less than the radius of the anti-PMD pulley 1.

The guide device that is movable in translation may comprise, for example, a V-groove pulley whose axis of rotation is parallel to the axis of rotation ar of the anti-PMD pulley 1. Nevertheless, such a guide device presents significant inertia, as does the oscillating pulley in the first prior art. With increasing amplitude in the twist torque, the amplitude of the movements of the pulleys increases and their inertia becomes more and more penalizing. In order to reduce the inertia of the guide device that is movable in translation, guide fingers are used instead of a V-groove pulley, such guide fingers presenting inertia that is much less than that of a pulley; guide fingers are also easier to clean than is a pulley having a narrow V-groove, since it suffices to turn the guide fingers about their axes of rotation, while a pulley having a broad V-groove so as to be easy to clean would be poor at guiding the optical fiber 4. A pulley having parallel faces could also be envisaged, however it is not very advantageous insofar as it does not control the component of movement of the optical fiber 4 in a direction parallel to the direction of said pulley having parallel faces and its point of contact with the optical fiber 4. Furthermore, a pulley of that type raises problems of cleaning due to the very small empty space that exists between its two parallel faces. It is therefore preferable for the guide device that is movable in translation to comprise at least two guide fingers between which the optical fiber 4 is to pass while the optical fiber 4 is being drawn. The guide device that is movable in translation may be the upstream guide device 2 or the downstream guide device 3. It is also possible for both the upstream and the downstream guide devices 2 and 3 to be guide devices that are movable in translation. The guide fingers are advantageously rotatable about mutually distinct axes. For example, in the upstream guide device 2, the axes of rotation 23 and 24 are parallel but they remain distinct. The spacing between the guide fingers is preferably large enough to avoid damaging the covering on the optical fiber 4 while the optical fiber 4 is being drawn. Nevertheless, this spacing should remain small enough to control angular displacement between the plane of the optical fiber 4 and the plane PP of the anti-PMD pulley 1. The spacing between the guide fingers (not visible in FIG. 1), is the empty space between the guide fingers in which the optical fiber 4 can pass.

The guide device that is movable in translation is preferably the downstream guide device 3, i.e. the guide device situated downstream from the anti-PMD pulley 1 relative to the travel direction dd2 of the optical fiber 4 while the optical fiber 4 is being drawn. Any variations caused by the movement in translation of the guide device 3 are generated further away from the other portions of the fiber-drawing tower situated further upstream, where the optical fiber is more sensitive, than would be the case if it were the upstream guide device 2 that was the guide device that is movement in translation. Furthermore, said variations are attenuated at the anti-PMD pulley 1. Avoiding or attenuating the propagation of vibration to the upstream portions of the fiber-drawing tower serves in particular to improve the quality of the covering on the optical fiber 4. For large amplitude movements in translation of the downstream guide device 3, the anti-PMD system preferably also includes additional guide means for the optical fiber situated downstream from the downstream guide device 3 in the travel direction dd2 of the optical fiber 4 while the optical fiber 4 is being drawn, so as to absorb any vibration that might occur.

The guide device that is movable in translation may also be the upstream guide device 2, i.e. the guide device situated upstream from the anti-PMD pulley 1 relative to the travel direction dd1 of the optical fiber while the optical fiber is being drawn. Under such circumstances, the anti-PMD system also includes additional optical fiber guide means situated upstream from the upstream guide device relative to the travel direction of the optical fiber 4 during drawing of the optical fiber 4, and regardless of the amplitude of the movement in translation of the upstream guide device 2 so as to avoid any vibration propagating towards the upstream portions of the fiber-drawing tower.

In a preferred embodiment, the only guide device that is movable in translation is the downstream guide device 3, the upstream guide device 2 not being movable in translation. In another embodiment, the only guide device that is movable in translation is the upstream guide device 2, the downstream guide device 3 not being movable in translation. In yet another preferred embodiment, both the upstream and the downstream guide devices 2 and 3 are movable in translation. In this preferred embodiment in which both guide devices are movable in translation, they preferably both move along the same translation direction dt. To increase the amplitude of the twisting torque applied to the optical fiber 4, the two guide devices move in opposition along said translation direction dt. While the upstream guide device 2 is moving in the direction of arrow s1, the downstream guide device 3 is moving in the direction of arrow s2, and vice versa. Thus, the contact area between the surface 10 of the anti-PMD pulley 1 and the portion of the optical fiber 4 that is angularly offset from the plane PP of the anti-PMD pulley 1 is greater, thus making it possible for given amplitude of the movement in translation to double the twisting torque applied to the optical fiber 4. It is also possible to control the upstream and downstream guide devices 2 and 3 independently of each other so as to impart twist profiles to the optical fiber 4 that are of shapes that are more random, or indeed more aperiodic, unlike triangular or sinusoidal profiles.

The anti-PMD pulley 1 is preferably a deflector pulley, i.e. the travel direction of the optical fiber 4 dd1 upstream from the anti-PMD pulley 1 and dd2 downstream from the anti-PMD pulley 1 are mutually perpendicular. The fiber-drawing tower generally includes a deflector pulley so as to reduce the height needed for fiber-drawing. However the anti-PMD pulley 1 may also be situated downstream from the deflector pulley relative to the travel direction of the optical fiber 4 during drawing of the optical fiber 4. In which case, the vibration propagating towards the portions of the fiber-drawing tower that are situated upstream from the deflector pulley are attenuated even further and the quality of the covering on the optical fiber 4 is further improved; the drawback is the need to add a pulley to the fiber-drawing tower. The anti-PMD pulley 1 must naturally be of sufficient width at its peripheral surface 10 to accommodate the excursions of the optical fiber 4 as it rolls on the surface 10.

In a numerical example of the invention, for a fiber-drawing speed of 600 m/min and for a frequency of oscillation in the translation motion of the downstream guide device 3 which is the only guide device of the movement in translation, the angular offset between the plane PP of the anti-PMD pulley 1 and the plane of the optical fiber 4 was varied over the range +13° to −13°, thereby imparting applied twist to the optical fiber 4 at abut three turns per meter.

What is claimed is:

1. An anti-PMD system comprising:
   an anti-PMD pulley (1) over which an optical fiber (4) is to roll and which is mounted to rotate about an axis of rotation (ar); and
   at least two optical fiber guide devices (2, 3) situated on either side of the anti-PMD pulley (1);
   the system being characterized in that the axis of rotation (ar) of the anti-PMD pulley (1) is stationary;
   in that the only degree of freedom of the anti-PMD pulley (1) is rotation about the axis of rotation (ar) of the anti-PMD pulley (1); and
   in that at least one of the guide devices (2, 3) is movable in translation in a translation direction (dt) that is not orthogonal to the axis of rotation (ar) of the anti-PMD pulley (1).

2. An anti-PMD system according to claim 1, characterized in that, while the optical fiber (4) is being drawn:
   the guide device (2, 3) that is movable in translation angularly offsets the optical fiber (4) relative to a plane (PP) perpendicular to the axis of rotation (ar) of the anti-PMD pulley (1); and
   the anti-PMD pulley (1) applies twisting torque to the optical fiber (4) alternately in the clockwise direction and in the counterclockwise direction so as to reduce the PMD of the optical fiber (4).

3. An anti-PMD system according to claim 2, characterized in that said translation direction (dt) of the guide device (2, 3) that is movable in translation lies in a plane parallel both to the axis of rotation (ar) of the anti-PMD pulley (1) and the travel direction (dd1, dd2) of the optical fiber (4) where it passes through the guide device (2, 3) while the optical fiber (4) is being drawn.

4. An anti-PMD system according to claim 3, characterized in that said translation direction (dt) is parallel to the axis of rotation (ar) of the anti-PMD pulley (1).

5. An anti-PMD system according to claim 1, characterized in that the distance between at least one point of contact between the optical fiber (4) and the guide device (2, 3) that is movable in translation, and at least one point of contact between the optical fiber (4) and the anti-PMD pulley (1) is less than or equal to the radius (R) of the anti-PMD pulley (1).

6. An anti-PMD system according to claim 5, characterized in that the distance between at least one point of contact between the optical fiber (4) and the guide device (2, 3) that is movable in translation, and at least one point of contact between the optical fiber (4) and the anti-PMD pulley (1) is less than or equal to half the radius (R) of the anti-PMD pulley (1).

7. An anti-PMD system according to claim 1, characterized in that the guide device (2, 3) that is movable in translation includes at least two guide fingers (21 & 22; 31

& 32) between which the optical fiber (4) passes while the optical fiber (4) is being drawn.

8. An anti-PMD system according to claim 7, characterized in that the guide fingers (21 & 22; 31 & 32) are movable in rotation about mutually distinct axes (23 & 24; 33 & 34).

9. An anti-PMD system according to claim 7, characterized in that the spacing between the guide fingers (21 & 22; 31 & 32) is such as to avoid damaging the covering on the optical fiber (4) while the optical fiber (4) is being drawn, and to control the angular displacement between the plane of the optical fiber (4) and the plane (PP) of the anti-PMD pulley (1).

10. An anti-PMD system according to claim 1, characterized in that the guide device (2, 3) that is movable in translation is a V-groove pulley whose axis of rotation is parallel to the axis of rotation (ar) of the anti-PMD pulley (1).

11. An anti-PMD system according to claim 1, characterized in that the movement in translation of the guide device (2, 3) that is movable in translation is slower at the ends of the stroke of said movement than in the middle of the stroke of said movement so as to impart a twist profile to the optical fiber (4) that is being drawn that is triangular rather than being sinusoidal.

12. An anti-PMD system according to claim 1, characterized in that at least the guide device (3) situated downstream from the anti-PMD pulley (1) relative to the travel direction (dd2) of the optical fiber (4) while the optical fiber (4) is being drawn is movable in translation in said translation direction (dt).

13. An anti-PMD system according to claim 12, characterized in that the anti-PMD system further comprises additional optical fiber guide means situated downstream from the downstream guide device (3) relative to the travel direction (dd2) of the optical fiber (4) while the optical fiber (4) is being drawn.

14. An anti-PMD system according to claim 1, characterized in that at least the guide device (2) situated upstream from the anti-PMD pulley (1) relative to the travel direction (dd1) of the optical fiber (4) while the optical fiber (4) is being drawn is movable in translation in said translation direction (dt), and in that the anti-PMD system further comprises additional optical fiber guide means situated upstream from the upstream guide device (2) relative to the travel direction (dd1) of the optical fiber (4) while the optical fiber (4) is being drawn.

15. An anti-PMD system according to claim 1, characterized in that both guide devices (2, 3) are movable in translation in said translation direction (dt).

16. An anti-PMD system according to claim 15, characterized in that both the two guide devices (2, 3) move in mutually opposite directions along said translation direction (dt).

17. An anti-PMD system according to claim 1, characterized in that the anti-PMD pulley (1) is a deflector pulley.

18. An anti-PMD system according to claim 1, characterized in that the anti-PMD system includes a deflector pulley, and in that the anti-PMD pulley (1) is situated downstream from the deflector pulley relative to the travel direction (dd2) of the optical fiber (4) while the optical fiber (4) is being drawn.

* * * * *